US011219849B2

(12) United States Patent
Nakano et al.

(10) Patent No.: US 11,219,849 B2
(45) Date of Patent: Jan. 11, 2022

(54) SOLID-LIQUID SEPARATOR AND SOLID-LIQUID SEPARATION SYSTEM

(71) Applicant: Tsurumi Manufacturing Co., Ltd., Osaka (JP)

(72) Inventors: Tsuyoshi Nakano, Shijonawate (JP); Tatsuya Senga, Nara (JP)

(73) Assignee: Tsurumi Manufacturing Co., Ltd., Osaka (JP)

( * ) Notice: Subject to any disclaimer, the term of this patent is extended or adjusted under 35 U.S.C. 154(b) by 571 days.

(21) Appl. No.: 16/083,158

(22) PCT Filed: Dec. 2, 2016

(86) PCT No.: PCT/JP2016/085962
§ 371 (c)(1),
(2) Date: Sep. 7, 2018

(87) PCT Pub. No.: WO2017/154291
PCT Pub. Date: Sep. 14, 2017

(65) Prior Publication Data
US 2020/0298151 A1     Sep. 24, 2020

(30) Foreign Application Priority Data

Mar. 9, 2016   (JP) .............................. JP2016-045977

(51) Int. Cl.
*B01D 33/11*       (2006.01)
*B01D 33/41*       (2006.01)
(Continued)

(52) U.S. Cl.
CPC .............. *B01D 36/02* (2013.01); *B01D 33/11* (2013.01); *B01D 33/275* (2013.01); *B01D 33/41* (2013.01);
(Continued)

(58) Field of Classification Search
CPC .... B01D 33/275; B01D 33/41; B01D 33/648; B01D 36/02; C02F 11/12; C02F 11/122; C02F 11/125
See application file for complete search history.

(56) References Cited

U.S. PATENT DOCUMENTS 4,186,089 A     1/1980  Okada
4,402,834 A *   9/1983  Bastgen ................. B01D 33/50
                                                             210/712
(Continued)

FOREIGN PATENT DOCUMENTS

JP      54-96247 A     7/1979
JP      1-297195 A     11/1989
(Continued)

OTHER PUBLICATIONS

Fukuda, Sadao et al—JP S54-96247 A Machine Translation—Jul. 30, 1979 (Year: 1979).*
(Continued)

*Primary Examiner* — Bradley R Spies
(74) *Attorney, Agent, or Firm* — Crowell & Moring LLP

(57) ABSTRACT

This solid-liquid separator (100a) includes a screw type dehydration unit (2) including a screw (22) and that performs primary dehydration on an object to be processed, and a rotary-body type dehydration unit (3) including a plurality of rotary bodies (30), disposed subsequent to the screw type dehydration unit, and that performs secondary dehydration on the object to be processed on which the primary dehydration has been performed by the screw type dehydration unit. The screw rotates at a higher rotational speed than those of the rotary bodies.

8 Claims, 5 Drawing Sheets

(51) Int. Cl.
*B01D 33/64* (2006.01)
*B01D 36/02* (2006.01)
*B01D 37/03* (2006.01)
*C02F 1/56* (2006.01)
*C02F 11/125* (2019.01)
*C02F 9/00* (2006.01)
*B01D 33/27* (2006.01)
*C02F 11/122* (2019.01)
*C02F 11/147* (2019.01)

(52) U.S. Cl.
CPC ............ *B01D 33/648* (2013.01); *B01D 37/03* (2013.01); *C02F 9/00* (2013.01); *C02F 11/122* (2013.01); *C02F 11/125* (2013.01); *C02F 11/147* (2019.01); *C02F 1/56* (2013.01)

(56) References Cited

U.S. PATENT DOCUMENTS

| | | | | |
|---|---|---|---|---|
| 5,344,574 A | * | 9/1994 | Hume | B01D 41/02 210/772 |
| 6,461,523 B1 | * | 10/2002 | Greenrose | B01D 29/6476 210/770 |
| 2011/0297016 A1 | | 12/2011 | Yamashita et al. | |

FOREIGN PATENT DOCUMENTS

| | | | |
|---|---|---|---|
| JP | 2-31807 | A | 2/1990 |
| JP | 4-131107 | A | 5/1992 |
| JP | 2000-254417 | A | 9/2000 |
| JP | 2004025129 | A * | 1/2004 |
| JP | 2005-7327 | A | 1/2005 |
| JP | 2006-167690 | A | 6/2006 |
| JP | 2013-208609 | A | 10/2013 |
| JP | 2015-73966 | A | 4/2015 |
| JP | 2015-167894 | A | 9/2015 |

OTHER PUBLICATIONS

Fukuda, Masahiko et al—JP 2004-025129 A Machine Translation—Jan. 29, 2004 (Year: 2004).*

Extended European Search Report issued in counterpart European Application No. 16893615.1 dated Sep. 25, 2019 (seven (7) pages).

International Search Report (PCT/ISA/210) issued in PCT Application No. PCT/JP2016/085962 dated Feb. 21, 2017 with English translation (five (5) pages).

Japanese-language Written Opinion (PCT/ISA/237) issued in PCT Application No. PCT/JP2016/085962 dated Feb. 21, 2017 (four (4) pages).

* cited by examiner

SOLID-LIQUID SEPARATOR AND SOLID-LIQUID SEPARATION SYSTEM

TECHNICAL FIELD

The present invention relates to a solid-liquid separator, and more particularly, it relates to a solid-liquid separator and a solid-liquid separation system each including layered rotary filter bodies.

BACKGROUND ART

In general, a solid-liquid separator including layered rotary filter bodies is known. Such a solid-liquid separator is disclosed in Japanese Patent Laid-Open No. 2005-7327, for example.

The aforementioned Japanese Patent Laid-Open No. 2005-7327 discloses a solid-liquid separator including a rotary-body type dehydration unit. The rotary-body type dehydration unit includes a plurality of rotary bodies including rotary shafts and layered rotary filter bodies, which are disposed along the axial directions of the rotary shafts and include filtration grooves, and disposed in two upper and lower rows, and dehydrates an object to be processed.

PRIOR ART

Patent Document

Patent Document 1: Japanese Patent Laid-Open No. 2005-7327

SUMMARY OF THE INVENTION

Problem to be Solved by the Invention

However, in the conventional solid-liquid separator as disclosed in Japanese Patent Laid-Open No. 2005-7327, it is necessary to rotate the rotary bodies at a relatively low speed in order to lower the moisture content of a discharged object to be processed (dehydrated cake), and thus there is a disadvantage that the efficiency of discharge is reduced. When the rotary bodies are rotated at a relatively high speed in order to achieve efficient discharge, on the other hand, there is a disadvantage that dehydration becomes insufficient and the moisture content becomes high. Therefore, there is a problem in the solid-liquid separator that it is difficult to achieve a balance between efficiently discharging the object to be processed and lowering the moisture content of the object to be processed.

The present invention has been proposed in order to solve the aforementioned problem, and an object of the present invention is to provide a solid-liquid separator and a solid-liquid separation system each capable of lowering the moisture content of an object to be processed and efficiently discharging the object to be processed.

Means for Solving the Problem

In order to attain the aforementioned object, a solid-liquid separator according to a first aspect of the present invention includes a screw type dehydration unit including a screw that includes a first rotary shaft and feeds a supplied object to be processed, and a layered filter body that surrounds the screw and includes a first filtration groove, and that performs primary dehydration on the object to be processed, and a rotary-body type dehydration unit including a plurality of rotary bodies that include second rotary shafts and layered rotary filter bodies disposed along axial directions of the second rotary shafts and including second filtration grooves, and disposed in two upper and lower rows, disposed subsequent to the screw type dehydration unit, and that performs secondary dehydration on the object to be processed on which the primary dehydration has been performed by the screw type dehydration unit. The screw rotates at a higher rotational speed than those of the rotary bodies.

As described above, the solid-liquid separator according to the first aspect of the present invention includes the screw type dehydration unit including the screw, which feeds the object to be processed, and that performs the primary dehydration on the object to be processed, and the rotary-body type dehydration unit including the rotary bodies, disposed subsequent to the screw type dehydration unit, and that performs the secondary dehydration on the object to be processed. Thus, as compared with the case where dehydration is conventionally performed in one stage only by the rotary-body type dehydration unit, dehydration can be performed in two stages by the screw type dehydration unit and the rotary-body type dehydration unit, and thus even when the rotational speed of the screw and the rotational speed of the rotary bodies are increased, the moisture content of the object to be processed can be lowered. Therefore, the solid-liquid separator can lower the moisture content of the object to be processed and can efficiently discharge the object to be processed. In general, squeezing filtration performed on an object to be processed containing more solids than an object to be processed on which gravity filtration is performed requires more time than the gravity filtration. Therefore, the rotary-body type dehydration unit is provided subsequent to the screw type dehydration unit, and the screw of the screw type dehydration unit is rotated at a higher rotational speed than those of the rotary bodies of the rotary-body type dehydration unit, such that after gravity filtration is performed in the screw type dehydration unit, more time can be allotted to perform squeezing filtration in the rotary-body type dehydration unit than the gravity filtration in the screw type dehydration unit. Consequently, the moisture content of the object to be processed can be effectively lowered. Note that the gravity filtration denotes filtration for filtering out liquids through fine gaps or the like, for example, and more particularly filtration for separating solids from liquids by gravity that acts on the liquids of the object to be processed. In addition, the squeezing filtration denotes filtration for squeezing out liquids from the object to be processed by pressurizing (squeezing) the object to be processed.

In the solid-liquid separator according to the first aspect, the screw type dehydration unit and the rotary-body type dehydration unit are preferably integrally provided. According to this configuration, as compared with the case where the screw type dehydration unit and the rotary-body type dehydration unit are provided as separate bodies, it is not necessary to provide a transfer facility for the object to be processed such as piping provided between the screw type dehydration unit and the rotary-body type dehydration unit, and thus the apparatus configuration can be simplified.

The solid-liquid separator according to the first aspect preferably further includes a flocculant supply unit that supplies a flocculant to the object to be processed on which the primary dehydration has been performed by the screw type dehydration unit. According to this configuration, the object to be processed can be flocculated during dehydration, and thus the object to be processed can be easily separated into solids and liquids. Consequently, the object to be processed can be more efficiently dehydrated. Furthermore, the flocculant supply unit supplies the flocculant to the object to be processed on which the primary dehydration has been performed, and thus the rotary bodies of the rotary-body type dehydration unit that performs the secondary dehydration can agitate the object to be processed and the flocculant. Therefore, it is not necessary to separately provide a configuration that agitates the object to be processed and the flocculant, and it is possible to significantly reduce or prevent complication of the apparatus configuration.

In the solid-liquid separator according to the first aspect, the screw type dehydration unit preferably includes a screw type dehydration unit discharge port through which the object to be processed is discharged to the rotary-body type dehydration unit, and the screw type dehydration unit discharge port is preferably disposed at substantially a same height position as that of a mixing tank discharge port of a mixing tank that discharges the object to be processed to the screw type dehydration unit. According to this configuration, unlike the case where the screw type dehydration unit discharge port is located at a position lower than that of the mixing tank discharge port, even when the primary dehydration is insufficient, it is possible to significantly reduce or prevent outflow of the object to be processed to the rotary-body type dehydration unit. Furthermore, unlike the case where the screw type dehydration unit discharge port is located at a position higher than that of the mixing tank discharge port, the screw type dehydration unit does not need to move the object to be processed to a higher position, and thus it is possible to significantly reduce or prevent an increase in the load on a drive of the screw.

In this case, the screw type dehydration unit preferably includes a screw type dehydration unit supply port to which the object to be processed is supplied from the mixing tank, and the screw type dehydration unit is preferably inclined obliquely upward toward the rotary-body type dehydration unit subsequent thereto such that the screw type dehydration unit discharge port is located above the screw type dehydration unit supply port. According to this configuration, the object to be processed can be supplied from the mixing tank to the screw type dehydration unit due to overflow, and the object to be processed can be easily supplied from the screw type dehydration unit to the rotary-body type dehydration unit due to overflow.

The solid-liquid separator according to the first aspect preferably further includes a tank integrally including a filtrate receiver that receives a filtrate that has passed through the first filtration groove of the screw type dehydration unit and a reservoir partitioned from the filtrate receiver and that stores a filtrate that has passed through the second filtration grooves of the rotary-body type dehydration unit, and the object to be processed stored in the reservoir is preferably returned to a stage precedent to the screw type dehydration unit. According to this configuration, the apparatus configuration can be simplified as compared with the case where the filtrate receiver and the reservoir are provided as separate bodies. Furthermore, the filtrate discharged from the rotary-body type dehydration unit is recirculated such that the processing can be reliably performed.

In the solid-liquid separator according to the first aspect, the screw type dehydration unit preferably includes a plurality of screw type dehydration units, and the plurality of screw type dehydration units are preferably disposed side by side along the axial directions of the second rotary shafts of the rotary-body type dehydration unit. According to this configuration, the plurality of screw type dehydration units are provided such that dehydration can be more efficiently performed. In addition, the screw type dehydration units can efficiently supply the object to be processed to the rotary-body type dehydration unit having a width relatively larger than those of the screw type dehydration units.

In the solid-liquid separator according to the first aspect, the screw is preferably rotated at a rotational speed of one or more revolutions per minute, and the rotary bodies are preferably rotated at a rotational speed of 0.5 or more revolutions per minute. According to this configuration, the screw is rotated at a rotational speed of one or more revolutions per minute such that the primary dehydration can be efficiently performed. Furthermore, the rotary bodies are rotated at a rotational speed of 0.5 or more revolutions per minute such that the secondary dehydration can be efficiently performed.

A solid-liquid separation system according to a second aspect of the present invention includes a screw type dehydration unit including a screw that includes a first rotary shaft and feeds a supplied object to be processed with rotation of the first rotary shaft, and a layered filter body that surrounds the screw and includes a first filtration groove, and that performs primary dehydration on the object to be processed, a rotary-body type dehydration unit including a plurality of rotary bodies that include second rotary shafts and layered rotary filter bodies disposed along axial directions of the second rotary shafts and including second filtration grooves, and disposed in two upper and lower rows, disposed subsequent to the screw type dehydration unit, and that performs secondary dehydration on the object to be processed on which the primary dehydration has been performed by the screw type dehydration unit, a tank integrally including a filtrate receiver that receives a filtrate that has passed through the first filtration groove of the screw type dehydration unit and a reservoir partitioned from the filtrate receiver and that stores a filtrate that has passed through the second filtration grooves of the rotary-body type dehydration unit, and a mixing tank to which the object to be processed is supplied from the tank, that flocculates and flocs a solid component of the supplied object to be processed, and supplies the object to be processed to the screw type dehydration unit. The screw rotates at a higher rotational speed than those of the rotary bodies.

As described above, the solid-liquid separation system according to the second aspect of the present invention includes the screw type dehydration unit including the screw, which feeds the object to be processed, and that performs the primary dehydration on the object to be processed, and the rotary-body type dehydration unit including the rotary bodies, disposed subsequent to the screw type dehydration unit, and that performs the secondary dehydration on the object to be processed. Thus, as compared with the case where dehydration is conventionally performed in one stage only by the rotary-body type dehydration unit, dehydration can be performed in two stages by the screw type dehydration unit and the rotary-body type dehydration unit, and thus even when the rotational speed of the screw and the rotational speed of the rotary bodies are increased, the moisture content of the object to be processed can be lowered. Therefore, the solid-liquid separator can lower the moisture content of the object to be processed and can efficiently discharge the object to be processed. In general, squeezing filtration performed on an object to be processed containing more solids than an object to be processed on which gravity filtration is performed requires more time than the gravity filtration. Therefore, the rotary-body type dehydration unit is provided subsequent to the screw type dehydration unit, and the screw of the screw type dehydration unit is rotated at a higher rotational speed than those of the rotary bodies of the rotary-body type dehydration unit, such that after gravity filtration is performed in the screw type dehydration unit, more time can be allotted to perform squeezing filtration in the rotary-body type dehydration unit than the gravity filtration in the screw type dehydration unit. Consequently, the moisture content of the object to be processed can be effectively lowered.

Effect of the Invention

According to the present invention, as described above, it is possible to provide the solid-liquid separator and the solid-liquid separation system each capable of lowering the moisture content of the object to be processed and efficiently discharging the object to be processed.

MODES FOR CARRYING OUT THE INVENTION

An embodiment of the present invention is hereinafter described on the basis of the drawings.

(Configuration of Solid-Liquid Separation System)

Figure 1:
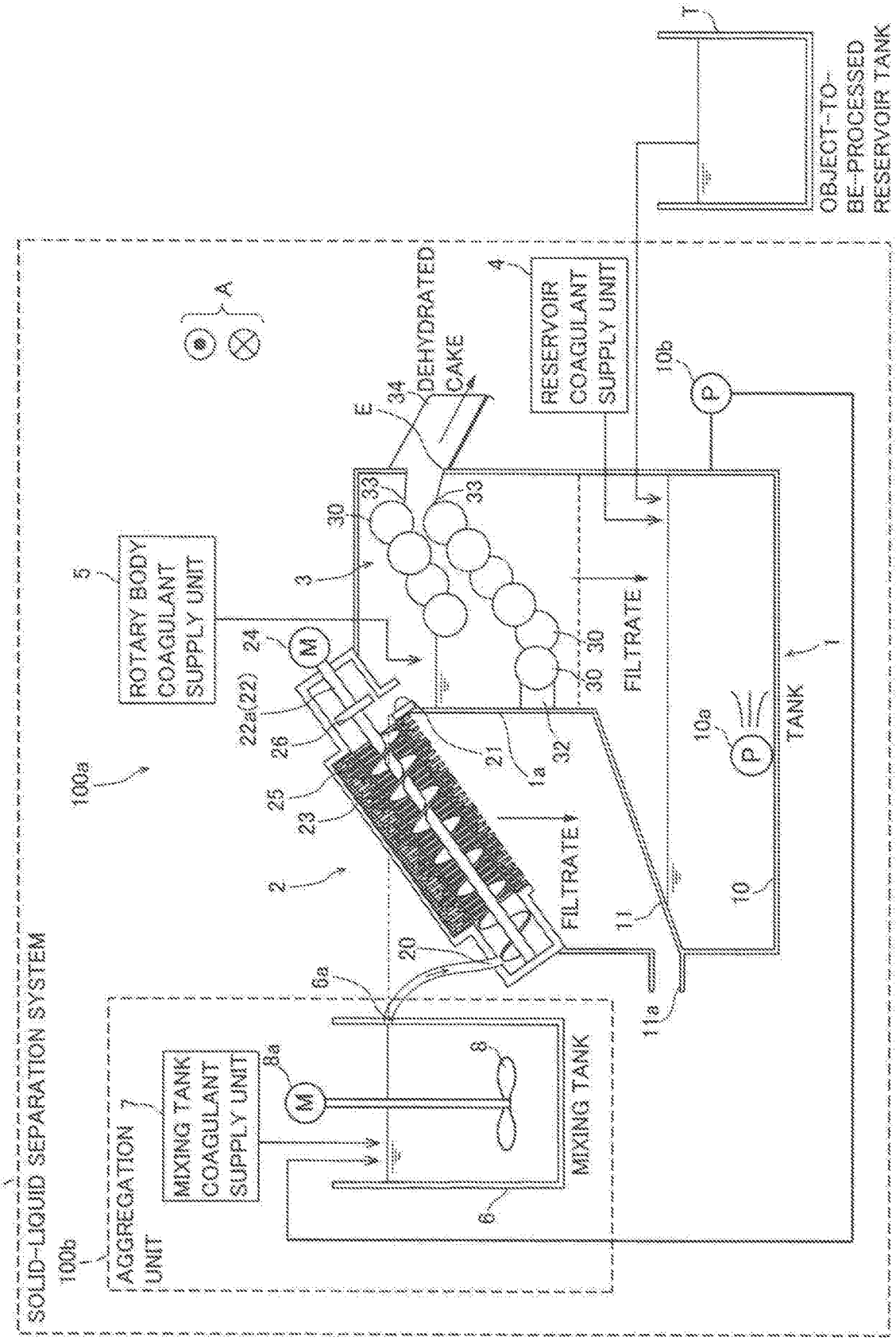
FIG. 1 A schematic view showing a solid-liquid separation system including a solid-liquid separator according to an embodiment of the present invention.

The embodiment of the present invention is now described with reference to FIGS. 1 to 8. As shown in FIG. 1, a solid-liquid separation system 100 according to the embodiment of the present invention includes a solid-liquid separator 100a and a flocculation unit 100b.

The solid-liquid separation system 100 receives an object to be processed such as sludge from an external object-to-be-processed reservoir tank T, supplies a flocculant a plurality of times (three times), and agitates the object to be processed to flocculate the object to be processed. Furthermore, the solid-liquid separation system 100 acquires (discharges) an object to be processed (dehydrated cake) having a low moisture content by performing a two-staged dehydration process on the flocculated object to be processed. Specifically, the solid-liquid separation system 100 performs primary dehydration mainly by gravity filtration in screw type dehydration units 2 described later. Thereafter, the solid-liquid separation system 100 performs secondary dehydration mainly by squeezing filtration in a rotary-body type dehydration unit 3, which is described later, disposed subsequent to the screw type dehydration units 2. The details are described later. Note that the gravity filtration denotes filtration for filtering out liquids through fine gaps or the like, for example, and more particularly filtration for separating solids from liquids by gravity that acts on the liquids of the object to be processed. In addition, the squeezing filtration denotes filtration for squeezing out liquids from the object to be processed by pressurizing (squeezing) the object to be processed.

(Configuration of Solid-Liquid Separator)

The configuration of the solid-liquid separator is now described with reference to FIGS. 1 to 8.

As shown in FIG. 1, the solid-liquid separator 100a includes a tank (service tank) 1, the screw type dehydration units 2, the rotary-body type dehydration unit 3, a reservoir flocculant supply unit 4, and a rotary body flocculant supply unit 5. Each of the screw type dehydration units 2 separates a relatively clear filtrate to be discharged to the outside of the apparatus from the object to be processed by performing the primary dehydration on the object to be processed. The rotary-body type dehydration unit 3 separates a relatively dirty filtrate to be stored in the tank 1 from the object to be processed (dehydrated cake), which is to be discharged to the outside of the apparatus, by performing the secondary dehydration on the object to be processed on which the primary dehydration has been performed by the screw type dehydration unit 2. The rotary body flocculant supply unit 5 is an example of a "flocculant supply unit" in the claims.

The tank 1 integrally includes a reservoir 10 and a filtrate receiver 11. The reservoir 10 and the filtrate receiver 11 overlap each other in a planar view (as viewed from above). The tank 1 includes a side plate 1a disposed between the screw type dehydration unit 2 and the rotary-body type dehydration unit 3. The reservoir 10 and the filtrate receiver 11 are partitioned by the side plate 1a. That is, the reservoir 10 and the filtrate receiver 11 do not directly give and receive the object to be processed to and from each other. Furthermore, the screw type dehydration unit 2 and the rotary-body type dehydration unit 3 are installed in the tank 1. Therefore, the screw type dehydration unit 2 and the rotary-body type dehydration unit 3 are integrally provided via the tank 1.

The reservoir 10 receives the object to be processed from the object-to-be-processed reservoir tank T and stores the object to be processed. Furthermore, the reservoir 10 stores a filtrate that has passed through second filtration grooves S2 (see FIG. 7), described later, of the rotary-body type dehydration unit 3. That is, the reservoir 10 stores the filtrate (liquids of the object to be processed) obtained by the secondary dehydration (dehydration mainly by squeezing filtration) in the rotary-body type dehydration unit 3.

The reservoir 10 includes an agitation pump 10a and a supply pump 10b. The agitation pump 10a flocculates the object to be processed (increase the concentration of solid components (floc)) by agitating the object to be processed, supplied from the object-to-be-processed reservoir tank T and the screw type dehydration unit 2 to the reservoir 10, and an inorganic flocculant supplied from the reservoir flocculant supply unit 4 to the reservoir 10. The supply pump 10b supplies (returns) the object to be processed, which has been flocculated and stored in the reservoir 10, to a stage (flocculation unit 100b) precedent to the screw type dehydration unit 2.

The filtrate receiver 11 receives a filtrate that has passed through first filtration grooves S1 (see FIG. 2), described later, of the screw type dehydration unit 2. That is, the filtrate receiver 11 receives the filtrate (object to be processed) obtained by the primary dehydration (dehydration mainly by gravity filtration) in the screw type dehydration unit 2. In addition, the filtrate receiver 11 includes a filtrate discharge port 11a. The filtrate receiver 11 is inclined obliquely to the filtrate discharge port 11a such that the filtrate discharge port 11a side lowers.

The screw type dehydration unit 2 includes a screw type dehydration unit supply port 20 to which the object to be processed is supplied from the flocculation unit 100b (mixing tank 6 described later) and a screw type dehydration unit discharge port 21 through which the object to be processed is discharged to the rotary-body type dehydration unit 3 disposed subsequent thereto. The screw type dehydration unit 2 is inclined obliquely upward toward the rotary-body type dehydration unit 3 subsequent thereto such that the screw type dehydration unit discharge port 21 is located above the screw type dehydration unit supply port 20. That is, in the screw type dehydration unit 2, the side close to the rotary-body type dehydration unit 3 is located above the side away from the rotary-body type dehydration unit 3.

The screw type dehydration unit 2 further includes a screw 22, a layered filter body 23 including a plurality of movable plates 23a (see FIG. 3) and a plurality of fixed plates 23b (see FIG. 3), a first motor 24, an outer frame 25, and a back pressure plate 26. The movable plates 23a and the fixed plates 23b have a ring shape.

Figure 2:
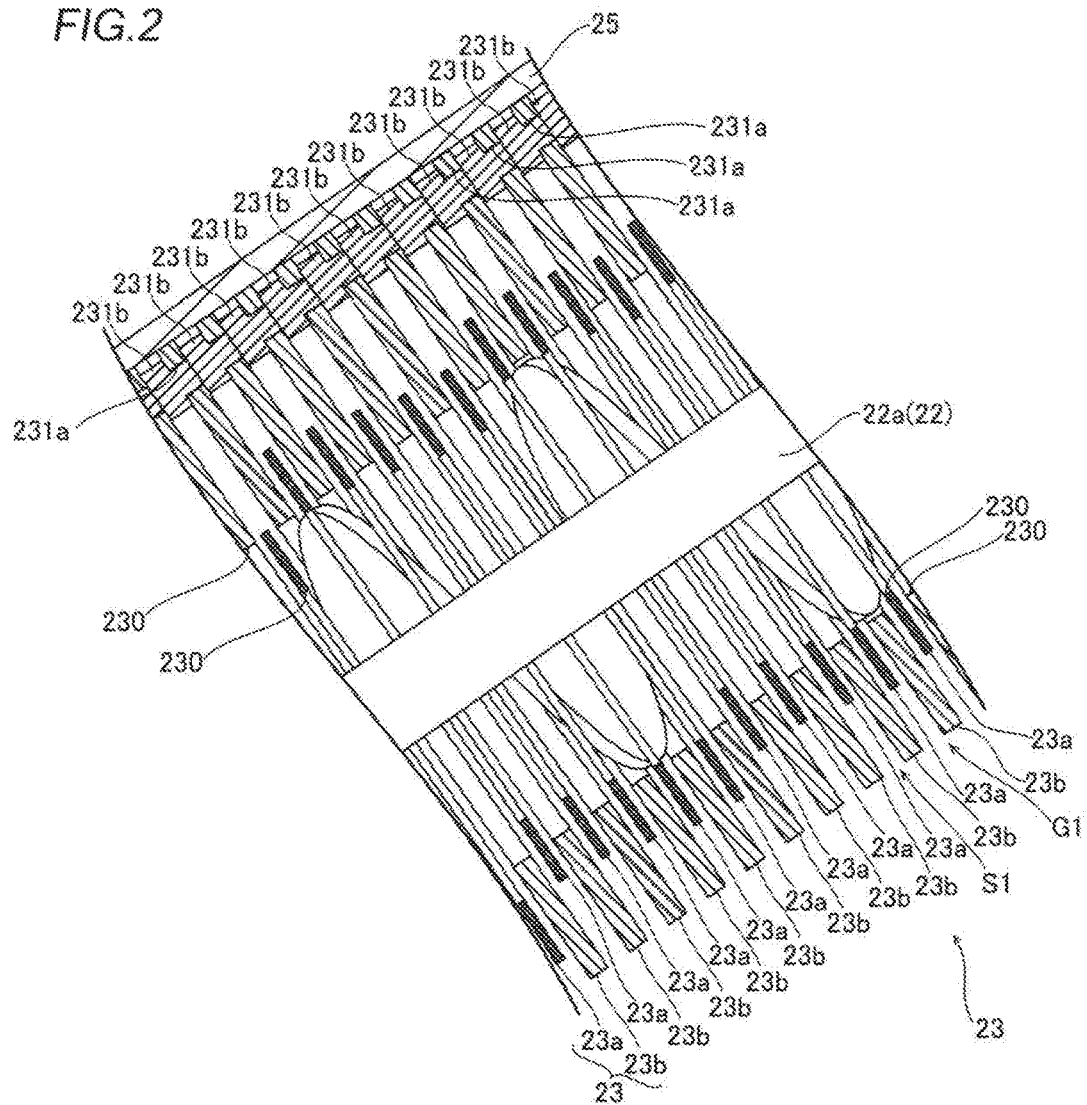
FIG. 2 An enlarged view of a main portion of a screw type dehydration unit according to the embodiment of the present invention.

The screw 22 includes a first rotary shaft 22a. Furthermore, the screw 22 rotates with rotation of the first motor 24. In addition, the screw 22 feeds the object to be processed, supplied from the screw type dehydration unit supply port 20, to the rotary body type dehydration unit 3 side with rotation of the first rotary shaft 22a. As shown in FIG. 2, the layered filter body 23 (the movable plates 23a and the fixed plates 23b) includes first holes 230 through which the screw 22 is inserted. The layered filter body 23 has a multiple plate structure in which the movable plates 23a and the fixed plates 23b are alternately layered so as to surround the screw 22 in a state where the screw 22 is inserted through the first holes 230.

The plurality of fixed plates 23b include second holes 231a (screw holes), into which spacers 231b are respectively screwed, separately from the first holes 230 through which the screw 22 is inserted. The spacers 231b are screwed into the second holes 231a such that the fixed plates 23b each keep a distance to another fixed plate 23b adjacent thereto at a predetermined distance. Thus, each of the first filtration grooves S1 is formed between the fixed plates 23b. In addition, filtrate outflow grooves G1 are formed in portions of the first filtration grooves S1 between the adjacent fixed plates 23b excluding the movable plates 23a.

The outer frame 25 fixes the plurality of fixed plates 23b. Specifically, the outer frame 25 is disposed in contact with outer peripheral ends of the plurality of fixed plates 23b. Furthermore, the outer frame 25 extends along the axial direction of the first rotary shaft 22a. A plurality of (three, for example) contact portions of the outer frame 25 with the fixed plates 23b are provided at equal intervals in the circumferential direction of the fixed plates 23b (only one contact portion is shown in FIG. 2). The plurality of fixed plates 23b are fixed to the outer frame 25 so as to maintain the layered state with the movable plates 23a. The inner peripheral surfaces of the movable plates 23a that define the first holes 230 come into contact with an outer peripheral portion of the screw 22 such that the movable plates 23a are constantly moved in the circumferential direction and the radial direction of the first rotary shaft 22a of the screw 22 as the screw 22 rotates. Thus, the screw type dehydration unit 2 constantly moves the movable plates 23a in the first filtration grooves S1 by the rotation of the screw 22 such that it is possible to significantly reduce or prevent clogging of the first filtration grooves S1.

The structure of the screw type dehydration unit 2 for the primary dehydration is now described together with the procedure for the primary dehydration with reference to FIGS. 1 and 2. As shown in FIG. 1, the screw type dehydration unit 2 pushes up the object to be processed obliquely upward toward the screw type dehydration unit discharge port 21 (rotary-body type dehydration unit 3 side) by the rotation of the screw 22 when the object to be processed is supplied to the screw type dehydration unit supply port 20 provided in the vicinity of the lower end. Thus, the screw type dehydration unit 2 feeds the object to be processed. Furthermore, as shown in FIG. 2, the screw type dehydration unit 2 discharges the filtrate from the first filtration grooves S1 to the filtrate receiver 11 by rotating the screw 22 to move the movable plates 23a. As shown in FIG. 1, the screw type dehydration unit 2 can pressurize the object to be processed, fed by the screw 22, with the back pressure plate 26. Specifically, the back pressure plate 26 can adjust the position of the first rotary shaft in the axial direction, and can pressurize the object to be processed immediately before discharge by adjusting the path width of the object to be processed toward the screw type dehydration unit discharge port 21. However, the screw type dehydration unit 2 is normally adjusted to widen the path width such that the back pressure plate 26 does not pressurize the object to be processed. The back pressure plate 26 is adjusted to pressurize the object to be processed as necessary such that gravity filtration is substantially completed in the screw type dehydration unit 2.

Figure 3:
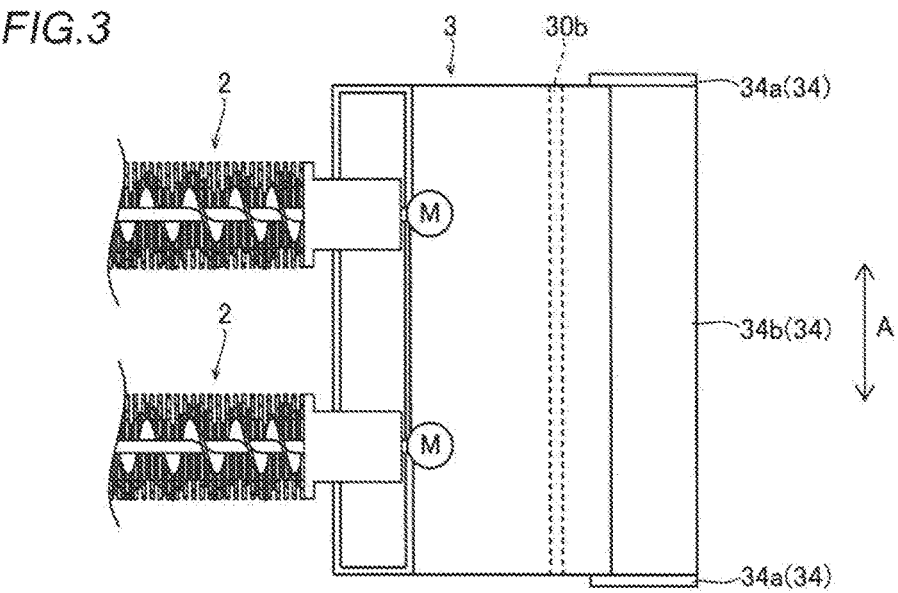
FIG. 3 A plan view showing the screw type dehydration unit and a rotary-body type dehydration unit according to the embodiment of the present invention.

As shown in FIG. 3, a plurality of (two) screw type dehydration units 2 are provided. Furthermore, the plurality of screw type dehydration units 2 are disposed side by side and parallel along the axial directions (direction A) of second rotary shafts 30b, described later, of the rotary-body type dehydration unit 3.

Figure 4:
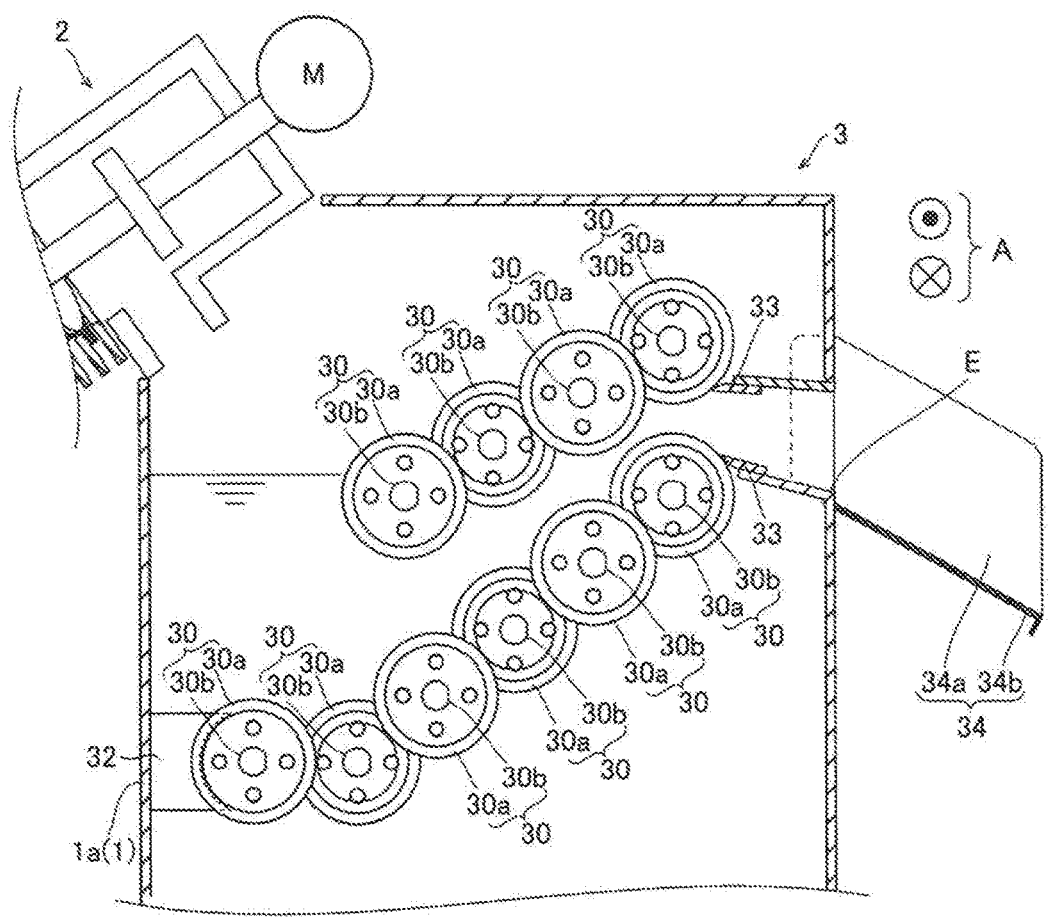
FIG. 4 A sectional side view showing the rotary-body type dehydration unit according to the embodiment of the present invention.

As shown in FIG. 4, the rotary-body type dehydration unit 3 includes a plurality of rotary bodies 30, a plurality of second motors 31 (see FIG. 5), a sealing member 32, sludge scraping plates 33, and a discharge chute 34.

The rotary bodies 30 include layered rotary filter bodies 30a and the second rotary shafts 30b.

A plurality of layered rotary filter bodies 30a are disposed in two upper and lower rows toward a solid discharge port E so as to feed the object to be processed to the solid discharge port E. In addition, six (four in the upper row) layered rotary filter bodies 30a in the lower row are disposed at predetermined intervals, and feed the object to be processed by rotating in the same direction as each other.

Figure 6:
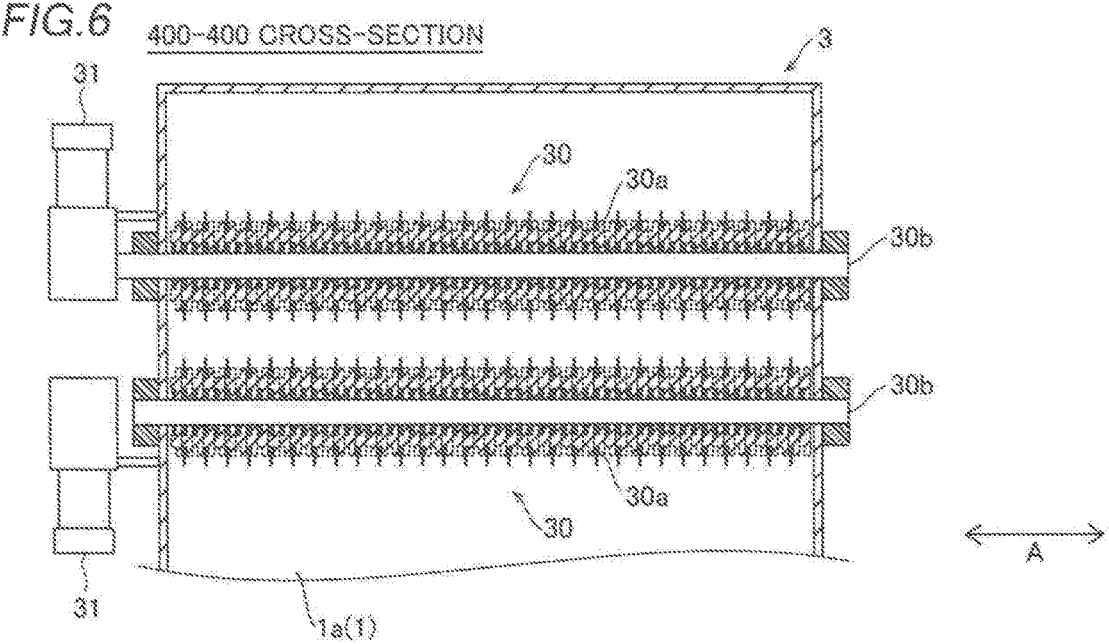
FIG. 6 A sectional view taken along the line 400-400 in FIG. 5.
Figure 7:
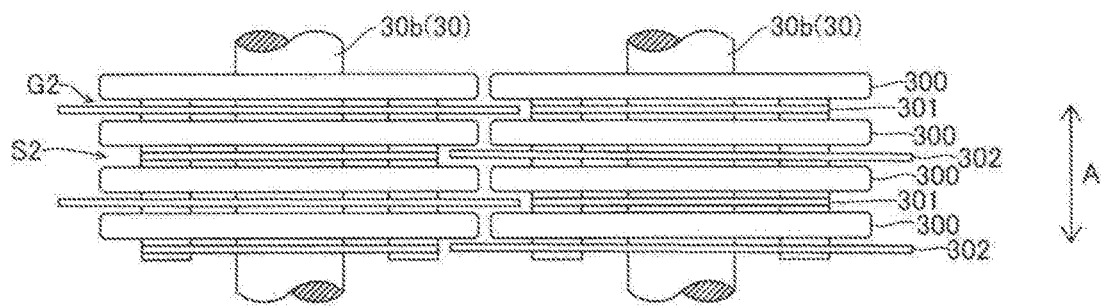
FIG. 7 An enlarged plan view showing the adjacent state of layered rotary filter bodies of the rotary-body type dehydration unit according to the embodiment of the present invention.
Figure 8:
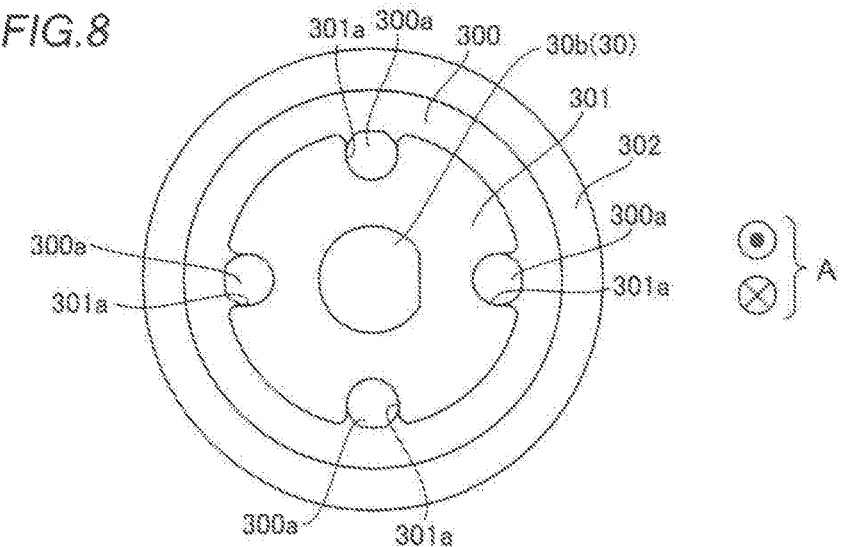
FIG. 8 An enlarged side view of the layered rotary filter bodies of the rotary-body type dehydration unit according to the embodiment of the present invention.

As shown in FIG. 6, the layered rotary filter bodies 30a include a plurality of filter pieces layered along the second rotary shafts 30b. Specifically, as shown in FIGS. 7 and 8, the layered rotary filter bodies 30a include three types of a plurality of medium-diameter disc filter pieces 300, a plurality of small-diameter disc filter pieces 301, and a plurality of large-diameter disc filter pieces 302. The second rotary shafts 30b extend in the direction A. On the second rotary shafts 30b, the large-diameter disc filter pieces 302 and the small-diameter disc filter pieces 301 are alternately layered between adjacent medium-diameter disc filter pieces 300.

As shown in FIG. 7, the second filtration grooves S2 are formed between the adjacent medium-diameter disc filter pieces 300. Specifically, the medium-diameter disc filter pieces 300 include protrusions 300a that come into contact with another medium-diameter disc filter piece 300 adjacent thereto in the axial direction (direction Y). The second filtration grooves S2 are formed between the medium-diameter disc filter pieces 300 separated by the protrusions 300a. The protrusions 300a are inserted into cutouts 301a of the small-diameter disc filter pieces 301 or holes (not shown) of the large-diameter disc filter pieces 302.

As shown in FIG. 7, the small-diameter disc filter pieces 301 can oscillate in the second filtration grooves S2 between the adjacent medium-diameter disc filter pieces 300. In addition, filtrate outflow grooves G2 are formed in portions of the second filtration grooves S2 between the adjacent medium-diameter disc filter pieces 300 excluding the small-diameter disc filter pieces 301. The large-diameter disc filter pieces 302 can oscillate in the second filtration grooves S2 between the adjacent medium-diameter disc filter pieces 300. In addition, filtrate outflow grooves G2 are formed in portions of the second filtration grooves S2 between the adjacent medium-diameter disc filter pieces 300 excluding the large-diameter disc filter pieces 302. Liquid components in unprocessed liquid are filtered through these filtrate outflow grooves G2.

As shown in FIG. 7, the large-diameter disc filter pieces 302 can oscillate into the second filtration grooves S2 of the adjacent layered rotary filter bodies 30a in a direction in which the solid components are fed (a direction perpendicular to the direction A). With this configuration, it is possible to significantly reduce or prevent clogging of the second filtration grooves S2 due to the oscillation of the large-diameter disc filter pieces 302 and the small-diameter disc filter pieces 301.

Figure 5:
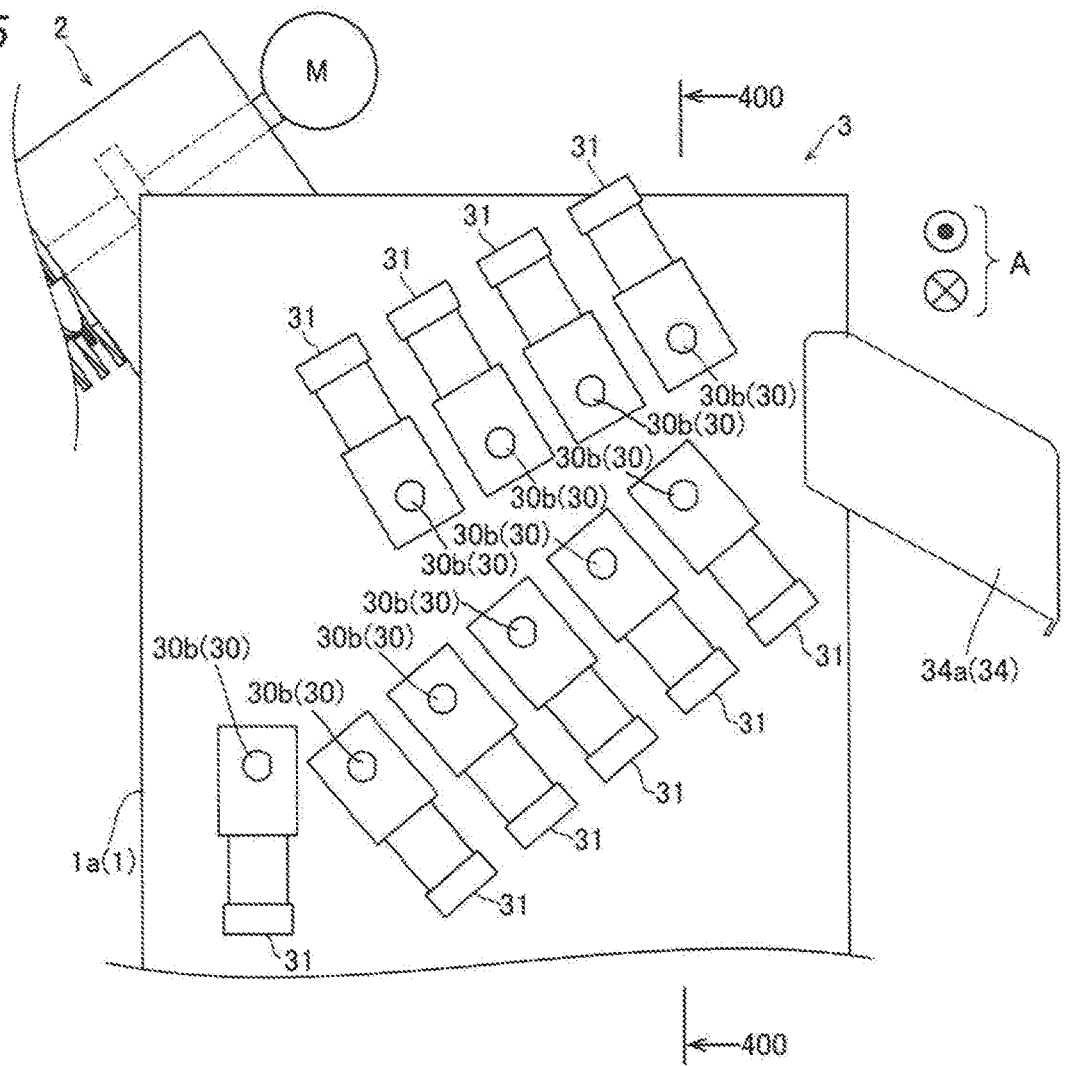
FIG. 5 A side view showing the rotary-body type dehydration unit according to the embodiment of the present invention.

As shown in FIGS. 5 and 6, a second motor 31 is provided at one end in the axial direction (direction A) of a second rotary shaft 30b of each of the plurality of layered rotary filter bodies 30a. In addition, the second motor 31 is provided for each of the plurality of (ten) layered rotary filter bodies 30a (for each rotary body 30). As shown in FIGS. 5 and 6, the plurality of (ten) second motors 31 may be disposed only on one side in the axial direction (direction A), or may be disposed on both sides in the axial direction. When the plurality of (ten) second motors 31 are disposed on both sides in the axial direction, the plurality of (ten) second motors 31 are preferably alternately disposed on one side and the other side in the axial direction.

The second motors 31 rotate the rotary bodies 30 at a rotational speed of 0.5 or more revolutions per minute. The first motor 24 of each of the screw type dehydration units 2 rotates the screw 22 at a rotational speed of one or more revolutions per minute. In addition, the screw 22 rotates at a higher speed than those of the rotary bodies 30. Preferably, the second motors 31 rotate the rotary bodies 30 at a rotational speed of one or more revolutions per minute, and the first motor 24 rotates the screw 22 at a rotational speed of three or more revolutions per minute. The rotational speed of the screw 22 is preferably adjusted such that gravity filtration is substantially completed in the screw type dehydration unit 2.

As shown in FIG. 1, one sealing member 32 is disposed between the side plate 1a of the tank 1 that partitions the screw type dehydration units 2 and the rotary-body type dehydration unit 3 and the most upstream rotary body 30 in the lower row. Thus, the sealing member 32 provides a seal such that the object to be processed does not pass from the screw type dehydration unit supply port 20 side to the reservoir 10 side.

One sludge scraping plate 33 is provided on each of the most downstream rotary body 30 in the lower row and the most downstream rotary body 30 in the upper row, and scrapes and removes solid materials caught between the layered rotary filter bodies 30a of the rotary bodies 30.

As shown in FIG. 1, the discharge chute 34 is provided at the solid discharge port E, and defines a discharge route for discharged matter discharged from the rotary-body type dehydration unit 3. Furthermore, the discharge chute 34 includes a pair of transverse plates 34a (only one transverse plate 34a on one side in the direction A is shown in FIG. 1) that face each other in the axial direction (direction Y) and a bottom plate 34b.

The reservoir flocculant supply unit 4 supplies the inorganic flocculant to the object to be processed that has been supplied to the reservoir 10. In addition, the rotary body flocculant supply unit 5 supplies a polymer flocculant to the object to be processed on which the primary dehydration has been performed by the screw type dehydration unit 2. Specifically, the rotary body flocculant supply unit 5 supplies the polymer flocculant to the object to be processed, which has been discharged from the screw type dehydration unit discharge port 21 of the screw type dehydration unit 2, from the upper side of the most upstream rotary body 30 in the lower row of the rotary-body type dehydration unit 3. The polymer flocculant supplied to the rotary-body type dehydration unit 3 by the rotary body flocculant supply unit 5 is agitated with the object to be processed by the rotary bodies 30.

(Configuration of Flocculation Unit)

The configuration of the flocculation unit 100b is now described with reference to FIG. 1.

The flocculation unit 100b includes the mixing tank 6, a mixing tank flocculant supply unit 7, and an impeller 8. The object to be processed is supplied from the reservoir 10 of the solid-liquid separator 100a to the mixing tank 6. The mixing tank 6 includes a mixing tank discharge port 6a through which the object to be processed is discharged to the screw type dehydration unit 2. The mixing tank discharge port 6a and the screw type dehydration unit discharge port 21 are disposed at substantially the same height position, as shown by a two-dot chain line that extends in a horizontal direction. The mixing tank flocculant supply unit 7 supplies a polymer flocculant to the mixing tank 6. The impeller 8 is disposed in the mixing tank 6. The impeller 8 includes a third motor 8a as a drive source. The impeller 8 flocculates the object to be processed (to increase the concentration of the solid components (floc)) by agitating the object to be processed and the polymer flocculant supplied to the mixing tank 6.

Effects of Embodiment

According to this embodiment, the following effects can be obtained.

According to this embodiment, as described above, the solid-liquid separator 100a includes the screw type dehydration unit 2 including the screw 22, which feeds the object to be processed, and that performs the primary dehydration on the object to be processed, and the rotary-body type dehydration unit 3 including the rotary bodies 30, disposed subsequent to the screw type dehydration unit 2, and that performs the secondary dehydration on the object to be processed. Thus, as compared with the case where dehydration is conventionally performed in one stage only by the rotary-body type dehydration unit 3, dehydration can be performed in two stages by the screw type dehydration unit 2 and the rotary-body type dehydration unit 3, and thus even when the rotational speed of the screw 22 and the rotational speed of the rotary bodies 30 are increased, the moisture content of the object to be processed can be lowered. Therefore, the solid-liquid separator 100a can lower the moisture content of the object to be processed and can efficiently discharge the object to be processed. In general, squeezing filtration performed on an object to be processed containing more solids than an object to be processed on which gravity filtration is performed requires more time than the gravity filtration. Therefore, the rotary-body type dehydration unit 3 is provided subsequent to the screw type dehydration unit 2, and the screw 22 of the screw type dehydration unit 2 is rotated at a higher rotational speed than those of the rotary bodies 30 of the rotary-body type dehydration unit 3, such that after gravity filtration is performed in the screw type dehydration unit 2, more time can be allotted to perform squeezing filtration in the rotary-body type dehydration unit 3 than the gravity filtration in the screw type dehydration unit 2. Consequently, the moisture content of the object to be processed can be effectively lowered.

According to this embodiment, as described above, the screw type dehydration unit 2 and the rotary-body type dehydration unit 3 are integrally provided. Thus, as compared with the case where the screw type dehydration unit 2 and the rotary-body type dehydration unit 3 are provided as separate bodies, it is not necessary to provide a transfer facility for the object to be processed such as piping provided between the screw type dehydration unit 2 and the rotary-body type dehydration unit 3, and thus the apparatus configuration can be simplified.

According to this embodiment, as described above, the solid-liquid separator 100a includes the rotary body flocculant supply unit 5 that supplies the flocculant to the object to be processed on which the primary dehydration has been performed by the screw type dehydration unit 2. Thus, the object to be processed can be flocculated by the rotary body flocculant supply unit 5 during dehydration, and thus the object to be processed can be easily separated into solids and liquids. Consequently, the object to be processed can be more efficiently dehydrated. Furthermore, the rotary body flocculant supply unit 5 supplies the flocculant to the object to be processed on which the primary dehydration has been performed, and thus the rotary bodies 30 of the rotary-body type dehydration unit 3 that performs the secondary dehydration can agitate the object to be processed and the flocculant. Therefore, it is not necessary to separately provide a configuration that agitates the object to be processed and the flocculant, and it is possible to significantly reduce or prevent complication of the apparatus configuration.

According to this embodiment, as described above, the screw type dehydration unit discharge port 21 through which the object to be processed is discharged to the rotary-body type dehydration unit 3 is provided in the screw type dehydration unit 2, and is disposed at substantially the same height position as that of the mixing tank discharge port 6a of the mixing tank 6, through which the object to be processed is discharged to the screw type dehydration unit 2. Thus, unlike the case where the screw type dehydration unit discharge port 21 is located at a position lower than that of the mixing tank discharge port 6a, even when the primary dehydration is insufficient, it is possible to significantly reduce or prevent outflow of the object to be processed to the rotary-body type dehydration unit 3. Furthermore, unlike the case where the screw type dehydration unit discharge port 21 is located at a position higher than that of the mixing tank discharge port 6a, the screw type dehydration unit 2 does not need to move the object to be processed to a higher position, and thus it is possible to significantly reduce or prevent an increase in the load on a drive of the screw 22.

According to this embodiment, as described above, the screw type dehydration unit supply port 20 to which the object to be processed is supplied from the mixing tank 6 is provided in the screw type dehydration unit 2, and the screw type dehydration unit 2 is inclined obliquely upward toward the rotary-body type dehydration unit 3 subsequent thereto such that the screw type dehydration unit discharge port 21 is located above the screw type dehydration unit supply port 20. Thus, the object to be processed can be supplied from the mixing tank 6 to the screw type dehydration unit 2 due to overflow, and the object to be processed can be easily supplied from the screw type dehydration unit 2 to the rotary-body type dehydration unit 3 due to overflow.

According to this embodiment, as described above, the solid-liquid separator 100a includes the tank 1 integrally including the filtrate receiver 11 that receives the filtrate that has passed through the first filtration grooves S1 of the screw type dehydration unit 2 and the reservoir 10 partitioned from the filtrate receiver 11 and that stores the filtrate that has passed through the second filtration grooves S2 of the rotary-body type dehydration unit 3, and the object to be processed stored in the reservoir 10 is returned to the stage precedent to the screw type dehydration unit 2. Thus, the apparatus configuration can be simplified as compared with the case where the filtrate receiver 11 and the reservoir 10 are provided as separate bodies. Furthermore, the filtrate discharged from the rotary-body type dehydration unit 3 is recirculated such that the processing can be reliably performed.

According to this embodiment, as described above, the solid-liquid separator 100a includes the plurality of screw type dehydration units 2, and the plurality of screw type dehydration units 2 are disposed side by side along the axial directions of the second rotary shafts 30b of the rotary-body type dehydration unit 3. Thus, the plurality of screw type dehydration units 2 are provided such that dehydration can be more efficiently performed. In addition, the screw type dehydration units 2 can efficiently supply the object to be processed to the rotary-body type dehydration unit 3 having a width relatively larger than those of the screw type dehydration units 2.

According to this embodiment, as described above, the screw 22 is rotated at a rotational speed of one or more revolutions per minute, and the rotary bodies 30 are rotated at a rotational speed of 0.5 or more revolutions per minute. Thus, the screw 22 is rotated at a rotational speed of one or more revolutions per minute such that the primary dehydration can be efficiently performed. Furthermore, the rotary bodies 30 are rotated at a rotational speed of 0.5 or more revolutions per minute such that the secondary dehydration can be efficiently performed.

(Modified Examples) The embodiment disclosed this time must be considered as illustrative in all points and not restrictive. The range of the present invention is not shown by the above description of the embodiment but by the scope of claims for patent, and all modifications (modified examples) within the meaning and range equivalent to the scope of claims for patent are further included.

For example, while the example in which the two screw type dehydration units are provided has been shown in the aforementioned embodiment, the present invention is not restricted to this. According to the present invention, one, or three or more screw type dehydration units may be provided.

While the example in which the plurality of screw type dehydration units are disposed in parallel has been shown in the aforementioned embodiment, the present invention is not restricted to this. According to the present invention, for example, the plurality of screw type dehydration units may not be disposed in parallel but may be disposed at a predetermined angle with respect to each other.

While the example in which the screw is rotated at a rotational speed of one or more revolutions per minute, and the rotary bodies are rotated at a rotational speed of 0.5 or more revolutions per minute has been shown in the aforementioned embodiment, the present invention is not restricted to this. According to the present invention, the screw may be rotated at a rotational speed of less than one revolution per minute, and the rotary bodies may be rotated at a rotational speed of less than 0.5 revolutions per minute.

While the example in which the screw type dehydration unit and the rotary-body type dehydration unit are integrally provided has been shown in the aforementioned embodiment, the present invention is not restricted to this. According to the present invention, the screw type dehydration unit and the rotary-body type dehydration unit may be separately provided.

While the example in which the screw type dehydration unit discharge port and the mixing tank discharge port are disposed at substantially the same height position has been shown in the aforementioned embodiment, the present invention is not restricted to this. According to the present invention, the screw type dehydration unit discharge port and the mixing tank discharge port may be disposed at different height positions.

While the example in which the solid-liquid separator includes the tank has been shown in the aforementioned embodiment, the present invention is not restricted to this. According to the present invention, the solid-liquid separator may not include the tank.

While the example in which the screw type dehydration unit is inclined obliquely upward toward the rotary-body type dehydration unit subsequent thereto such that the screw type dehydration unit discharge port is located above the screw type dehydration unit supply port has been shown in the aforementioned embodiment, the present invention is not restricted to this. According to the present invention, the screw type dehydration unit may not be inclined obliquely upward toward the rotary-body type dehydration unit subsequent thereto such that the screw type dehydration unit discharge port is not located above the screw type dehydration unit supply port. For example, the screw type dehydration unit may be horizontally disposed.

The invention claimed is:

1. A solid-liquid separator comprising:
a screw type dehydration unit including a screw that includes a first rotary shaft and is configured to feed a supplied object to be processed with rotation of the first rotary shaft, and a layered filter body that surrounds the screw and includes a first filtration groove, the screw type dehydration unit being configured to perform primary dehydration on the object to be processed;
a rotary-body type dehydration unit including a plurality of rotary bodies that include second rotary shafts and layered rotary filter bodies disposed along axial directions of the second rotary shafts and including second filtration grooves, the plurality of rotary bodies disposed in two upper and lower rows, the rotary-body type dehydration unit disposed subsequent to the screw type dehydration unit and configured to perform secondary dehydration on the object to be processed on which the primary dehydration has been performed by the screw type dehydration unit;
a filtrate receiver configured to receive a filtrate that has passed through the first filtration groove of the screw type dehydration unit; and
a reservoir configured to store a filtrate that has passed through the second filtration grooves of the rotary-body type dehydration unit; wherein
the solid-liquid separator is configured to rotate the screw at a higher rotational speed than those of the rotary bodies;
the screw type dehydration unit and the rotary-body type dehydration unit are integrally provided;
the solid-liquid separator is configured to separate the filtrate that has passed through the first filtration groove of the screw type dehydration unit from the filtrate that has passed through the second filtration groove of the rotary-body type dehydration unit by the filtrate receiver; and
the reservoir and the filtrate receiver are configured to be integrally provided and not directly give and receive the object to be processed to and from each other.

2. The solid-liquid separator according to claim 1, further comprising a flocculant supply unit that is configured to supply a flocculant to the object to be processed on which the primary dehydration has been performed by the screw type dehydration unit.

3. The solid-liquid separator according to claim 1, wherein
the screw type dehydration unit includes a screw type dehydration unit discharge port through which the object to be processed is dischargeable to the rotary-body type dehydration unit; and
the screw type dehydration unit discharge port is disposed at substantially a same height position as that of a mixing tank discharge port of a mixing tank that is configured to discharge the object to be processed to the screw type dehydration unit.

4. The solid-liquid separator according to claim 3, wherein
the screw type dehydration unit includes a screw type dehydration unit supply port to which the object to be processed is suppliable from the mixing tank; and
the screw type dehydration unit is inclined obliquely upward toward the rotary-body type dehydration unit subsequent thereto such that the screw type dehydration unit discharge port is located above the screw type dehydration unit supply port.

5. The solid-liquid separator according to claim 1, further comprising a tank integrally including the filtrate receiver and the reservoir, which is partitioned from the filtrate receiver; wherein
the object to be processed stored in the reservoir is returnable to a stage precedent to the screw type dehydration unit.

6. The solid-liquid separator according to claim 1, wherein
the screw type dehydration unit includes a plurality of screw type dehydration units; and
the plurality of screw type dehydration units are disposed side by side along the axial directions of the second rotary shafts of the rotary-body type dehydration unit.

7. The solid-liquid separator according to claim 1, configured to rotate the screw at a rotational speed of one or more revolutions per minute; and rotate the rotary bodies at a rotational speed of 0.5 or more revolutions per minute.

8. A solid-liquid separation system comprising:

a solid-liquid separator according to claim 1;

a tank integrally including the filtrate receiver and the reservoir, which is partitioned from the filtrate receiver; and a mixing tank to which the object to be processed is suppliable from the tank, that is configured to flocculate and flocs a solid component of the supplied object to be processed, and is configured to supply the object to be processed to the screw type dehydration unit.

* * * * *